US007267704B2

(12) United States Patent
Allgeier

(10) Patent No.: US 7,267,704 B2
(45) Date of Patent: Sep. 11, 2007

(54) FILTER ASSEMBLY FOR A VACUUM CLEANER

(75) Inventor: David M. Allgeier, North Canton, OH (US)

(73) Assignee: The Hoover Company, North Canton, OH (US)

( * ) Notice: Subject to any disclaimer, the term of this patent is extended or adjusted under 35 U.S.C. 154(b) by 222 days.

(21) Appl. No.: 10/417,822

(22) Filed: Apr. 17, 2003

(65) Prior Publication Data

US 2004/0206238 A1    Oct. 21, 2004

(51) Int. Cl.
  *B01D 35/30*    (2006.01)
(52) U.S. Cl. .................. 55/429; 55/486; 55/503; 55/DIG. 3; 95/273; 95/287; 96/415; 15/352
(58) Field of Classification Search .......... 15/350, 15/346, 351, 352, 347; 55/459.1, 300, 305, 55/DIG. 3, 429, 486, 503, 319; 95/273, 95/287
  See application file for complete search history.

(56) References Cited

U.S. PATENT DOCUMENTS

| | | | |
|---|---|---|---|
| 3,621,640 A | | 11/1971 | Ohno |
| 6,125,501 A * | | 10/2000 | Yip ............... 15/344 |
| 6,219,880 B1 * | | 4/2001 | Worden et al. ......... 15/347 |
| 6,314,610 B1 * | | 11/2001 | Miller et al. .......... 15/347 |
| 6,375,696 B2 * | | 4/2002 | Wegelin et al. ........ 55/337 |
| 6,436,160 B1 * | | 8/2002 | Stephens et al. ....... 55/337 |
| 6,596,044 B1 * | | 7/2003 | Bilek et al. .......... 55/337 |
| 6,598,263 B2 * | | 7/2003 | Boles et al. .......... 15/352 |
| 6,609,270 B2 * | | 8/2003 | Kim .................. 15/347 |
| 6,615,444 B2 * | | 9/2003 | McGilll et al. ........ 15/352 |
| 6,626,973 B2 * | | 9/2003 | Park ................. 55/480 |
| 6,647,587 B1 * | | 11/2003 | Ohara et al. .......... 15/350 |
| 6,757,933 B2 * | | 7/2004 | Oh et al. ............ 15/353 |
| 6,758,874 B1 * | | 7/2004 | Hunter, Jr. .......... 55/337 |
| 6,875,255 B2 * | | 4/2005 | Alford et al. ......... 95/273 |

OTHER PUBLICATIONS

National Carpeter Model MC-110U (1979) photographs, 4 sheets.

* cited by examiner

*Primary Examiner*—Duane Smith
*Assistant Examiner*—Minh-Chau T. Pham
(74) *Attorney, Agent, or Firm*—A. Burgess Lowe; John W. Morrison

(57) ABSTRACT

A dirt filtering apparatus for a vacuum cleaner is disclosed. The dirt filtering apparatus includes a lid member having an exit opening defined therethrough, a sealing arrangement around the periphery of the lid member and adapted to engage a sidewall of a removable dirt cup, and a removable filter attached to the lid member in a covering relationship to the exit opening. The dirt filtering apparatus further includes a removable screen support attached to the lid member and surrounding the filter member. The dirt filtering apparatus yet further includes a horizontal opening defined through the screen support and a screen element covering the horizontal opening. A method of operating a filter assembly is also disclosed.

21 Claims, 18 Drawing Sheets

FILTER ASSEMBLY FOR A VACUUM CLEANER

TECHNICAL FIELD

Generally, this invention relates to vacuum cleaners. In particular, the invention relates to a filter assembly for a vacuum cleaner. Moreover, the invention relates to a filter assembly for use in a bagless vacuum cleaner.

BACKGROUND OF THE INVENTION

Upright vacuum cleaners are well known in the art. Typically, these vacuum cleaners include an upper housing pivotally mounted to a vacuum cleaner foot. The foot is formed with a nozzle opening defined in an underside thereof and may include an agitator mounted therein for loosening dirt and debris from a floor surface. A motor and fan may be mounted to either the foot or the housing for producing suction at the nozzle opening. The suction at the nozzle opening picks up the loosened dirt and debris and produces a flow of dirt-laden air which is ducted to the vacuum cleaner housing.

In conventional vacuum cleaners, the dirt laden air is ducted into a filter bag supported on or within the vacuum cleaner housing. Alternatively, bagless vacuum cleaners duct the flow of dirt-laden air into a dirt separation system having a dirt cup which filters the dirt particles from the airflow before exhausting the filtered airflow into the atmosphere. Various dirt separation systems have been used on bagless vacuum cleaners to separate the dirt particles from the airflow. For example, some vacuum cleaners have dirt cups with outer walls comprising a filter material. Locating the filter material along the lid or outer walls has the distinct advantage of permitting the use of a large amount of filter material similar to the amount of material in a filter bag. However, such vacuum cleaners have a disadvantage of not permitting the operator to view the accumulated material within the dirt cup. Other vacuums, place the filter element in an interior portion of the dirt cup. Such dirt cups do not take advantage of the larger surface available on an outer wall of the dirt cup.

What is needed therefore, is a filter assembly that overcomes the above-mentioned drawbacks.

SUMMARY OF THE INVENTION

In accordance with a first aspect of the present invention, there is provided a dirt filtering apparatus. The dirt filtering apparatus includes a lid member having an exit opening defined therethrough a sealing arrangement around the periphery of the lid member and adapted to engage a sidewall of a removable dirt cup, and a removable filter attached to the lid member in a covering relationship to the exit opening. The dirt filtering apparatus further includes a removable screen support attached to the lid member and surrounding the filter member. The dirt filtering apparatus yet further includes a horizontal opening defined through the screen support and a screen element covering the horizontal opening.

In accordance with a second aspect of the present invention, there is provided an upright vacuum cleaner. The upright vacuum cleaner includes a carpet engaging nozzle base and an upper housing pivotally connected to the nozzle base. The upright vacuum cleaner further includes a dirt cup removably secured to the upper housing and a lid member having an exit opening defined therethrough. The upright vacuum cleaner yet further includes a sealing arrangement around the periphery of the lid member and adapted to engage a sidewall of the removable dirt cup and a removable filter attached to the lid member in a covering relationship to the exit opening. The upright vacuum cleaner still further includes a removable screen support attached to the lid member and surrounding the filter member and a horizontal opening defined through the screen support and a screen element covering the horizontal opening.

In accordance with a third aspect of the present invention, there is provided a method of operating a filter assembly. The method includes the step of attaching a filter member to a lid member having an exit opening defined therethrough. The method further includes the step of positioning a screen support about the filter member. The method yet further includes the steps of securing the screen support to the lid member and sealing the lid member to a side wall of a dirt cup.

BRIEF DESCRIPTION OF DRAWINGS

FIG. 7A is an enlarged cutaway view of a portion of the vacuum cleaner of FIG. 7;

FIG. 12A is an enlarged view of a portion of upper housing shown in FIG. 12;

DETAILED DESCRIPTION

Figure 1:
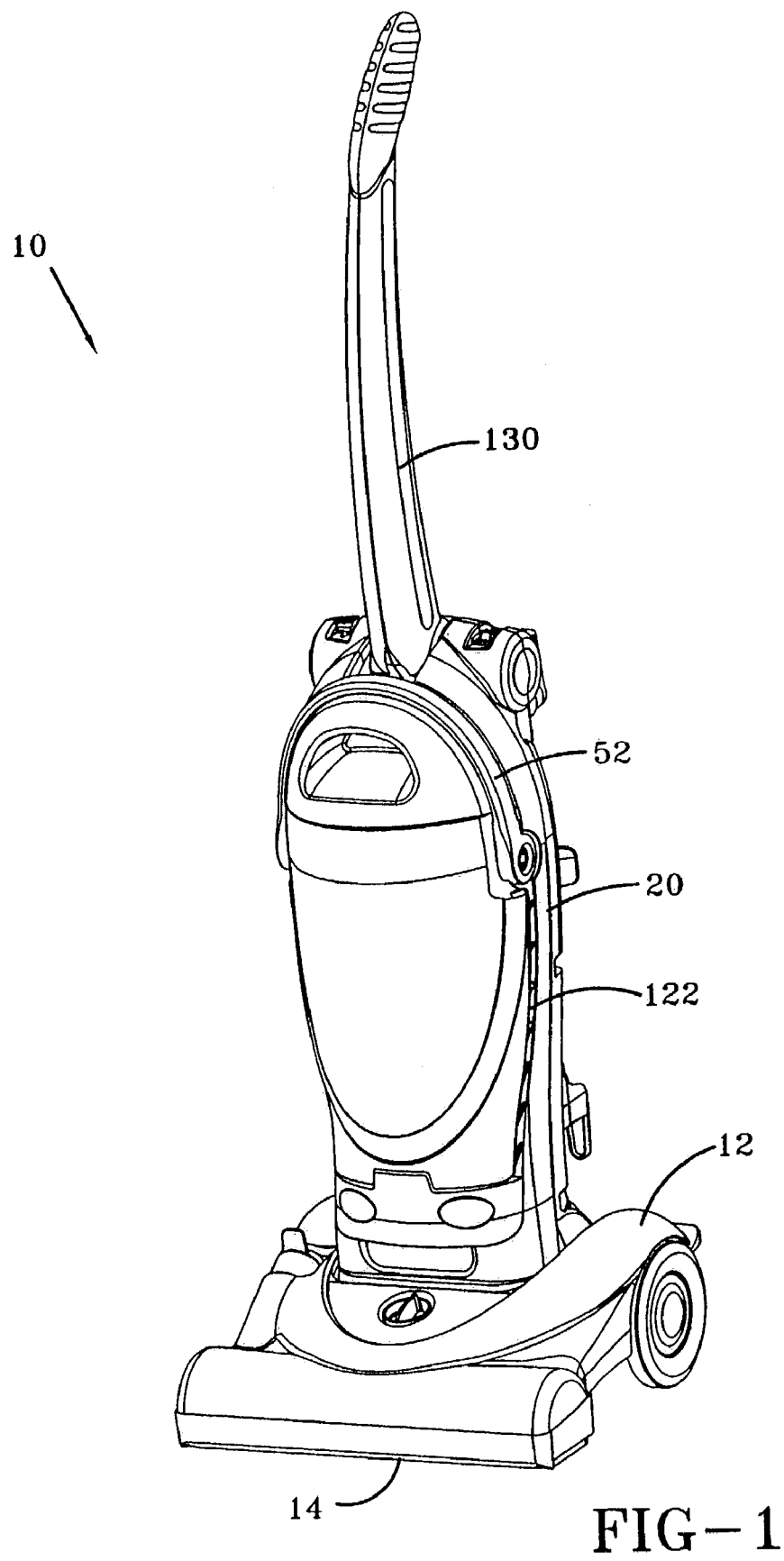
FIG. 1 is a perspective view of an upright vacuum cleaner which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an upright vacuum cleaner 10 which incorporates the features of the present invention therein. The vacuum cleaner 10 includes a vacuum cleaner base 12 and a vacuum cleaner upper housing 20 pivotally connected to the base 12. The base 12 is adapted to engage a carpeted floor surface. The base 12 includes a nozzle opening 14 formed in an underside thereof for suctioning of dirt particles from a carpeted floor surface. In addition, an agitator 154 (see FIG. 18) is positioned within the nozzle opening 14 to assist in removing dirt particles from the carpeted floor surface.

Figure 2:
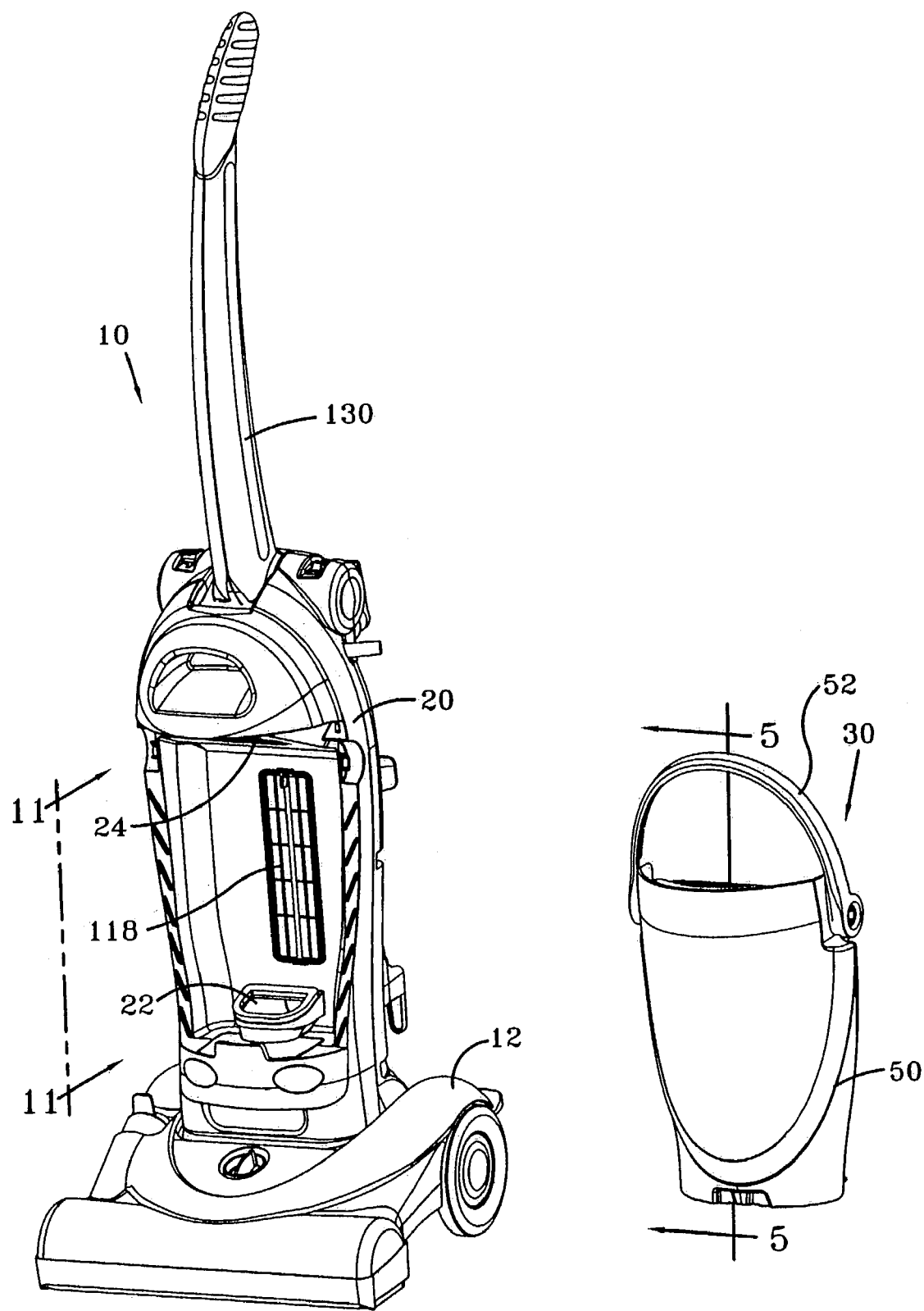
FIG. 2 is a perspective view similar to FIG. 1, but showing a dirt separation system removed from the vacuum cleaner.

Referring now to FIG. 2, there is shown the vacuum cleaner of FIG. 1, with a dirt separation system 30 removed from the upper housing 20. The upper housing 20 includes an inlet interface 22 in fluid communication with the nozzle opening 14. The upper housing 20 further includes an outlet interface 24 for exhausting filtered air from the removable dirt separation system 30. A motor-fan unit 26 (See FIG. 10) is positioned in a lower portion of the upper housing 20 and is adapted to generate an airflow from the nozzle opening 14 to the outlet interface 24. In this type of vacuum cleaner, the motor-fan unit 26 is positioned downstream from the outlet interface 24 such that the low pressure at a fan inlet 127 creates an airflow that draws low pressure air from the nozzle opening 14 to the outlet interface 24 via the inlet interface 22 and dirt separation system 30. The air which reaches the motor-fan unit 26 has been filtered by the dirt separation system 30 prior to reaching the motor/fan unit 26, hence these vacuums are generally referred to as "clean air" units. The air which exits the motor-fan unit 26 is then exhausted from the vacuum cleaner 10.

In another type of vacuum cleaner, the motor-fan unit 26 is positioned between the nozzle opening 14 and the inlet interface 22 such that the low pressure at the fan inlet creates a suction in the nozzle opening 14. This suction draws the loosened dirt from the floor surface into nozzle opening 14 and creates a flow of dirt-laden air which travels through the motor-fan unit 26. The flow of dirt-laden air is blown upwardly through the inlet interface 22 through the dirt separation system 30, through the outlet interface 24 and exhausted from the vacuum cleaner 10. The air which reaches the motor-fan unit 26 has not been filtered either by the dirt separation system 30 or a bag prior to reaching the motor/fan unit 26, hence these vacuum cleaners are generally referred to as "dirty air" units. It should be appreciated that the inventions described herein may be used in either a dirty air unit or a clean air unit without deviating from the scope of the invention.

Figure 3:
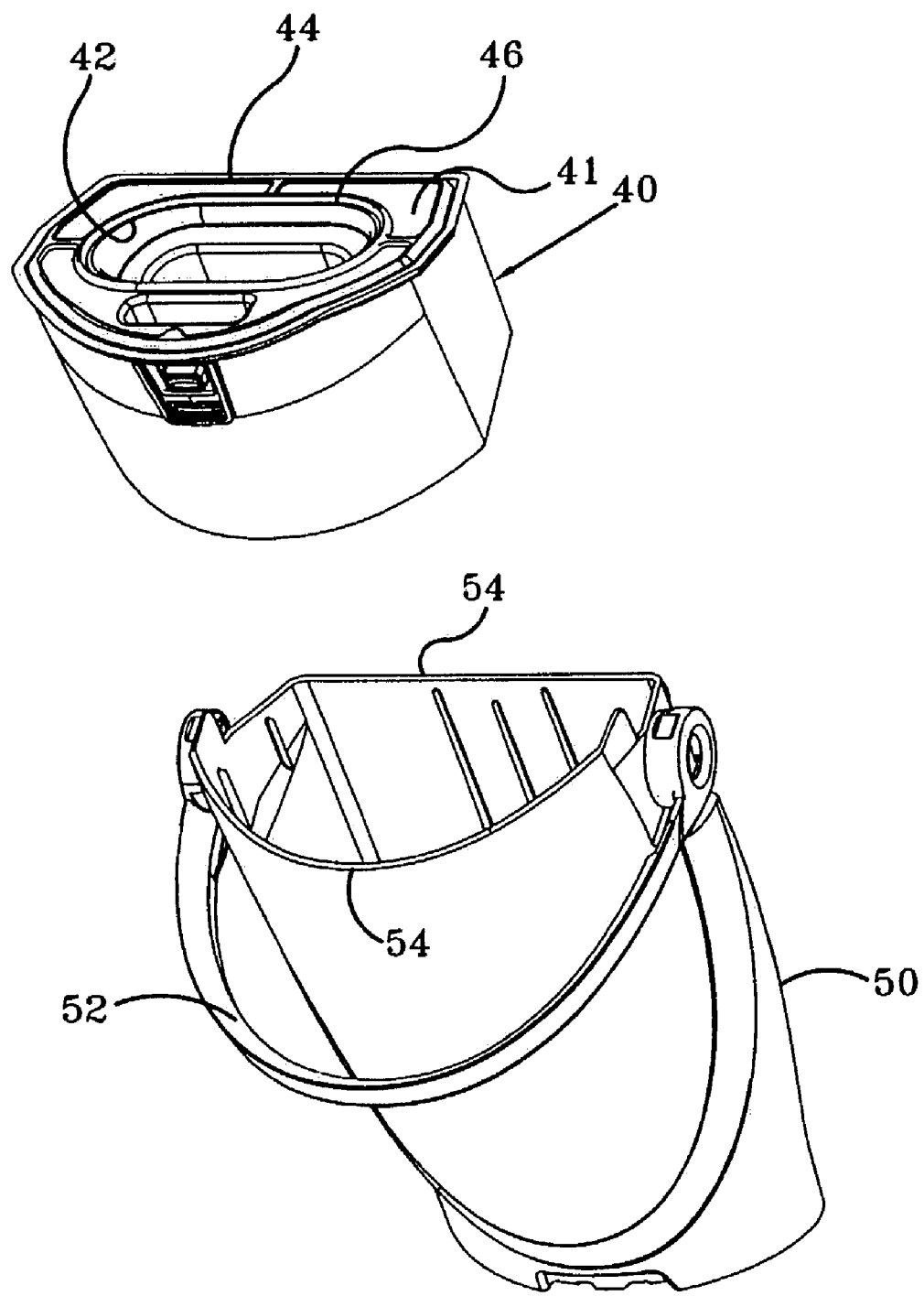
FIG. 3 is a perspective view of the dirt separation system of FIG. 2 with a filter assembly removed.

Referring now to FIG. 3, there is shown an exploded view of the dirt separation system 30 with a filter assembly 40 removed to show the interior of a bucket, or dirt cup 50. The dirt cup or bucket 50 has a distinctive bucket handle 52 rotatably attached thereto. The dirt cup 50 also includes a number of sidewalls 54 which define the exterior of the dirt cup 50. The bucket handle 52 is movable between a generally vertical first position, shown in FIG. 1, a generally vertical carry position, shown in FIG. 2, an emptying position shown in FIG. 9, and a generally horizontal second position, shown in FIG. 3. The filter assembly 40 includes a lid member 41 having an exit opening 42 defined therethrough. A compressible seal 46 around the periphery of the exit opening 42 is adapted to seal against the exit interface 24 (See FIG. 2) of the upper housing 20. The lid member 41 further includes a sealing arrangement 44 around the periphery of the lid member 41. The sealing arrangement 44 is bonded to the lid member 41 and is adapted to engage and seal against one or more of the side walls 54 of the dirt cup 50 to prevent dirt laden particles from bypassing the exit opening.

Figure 4:
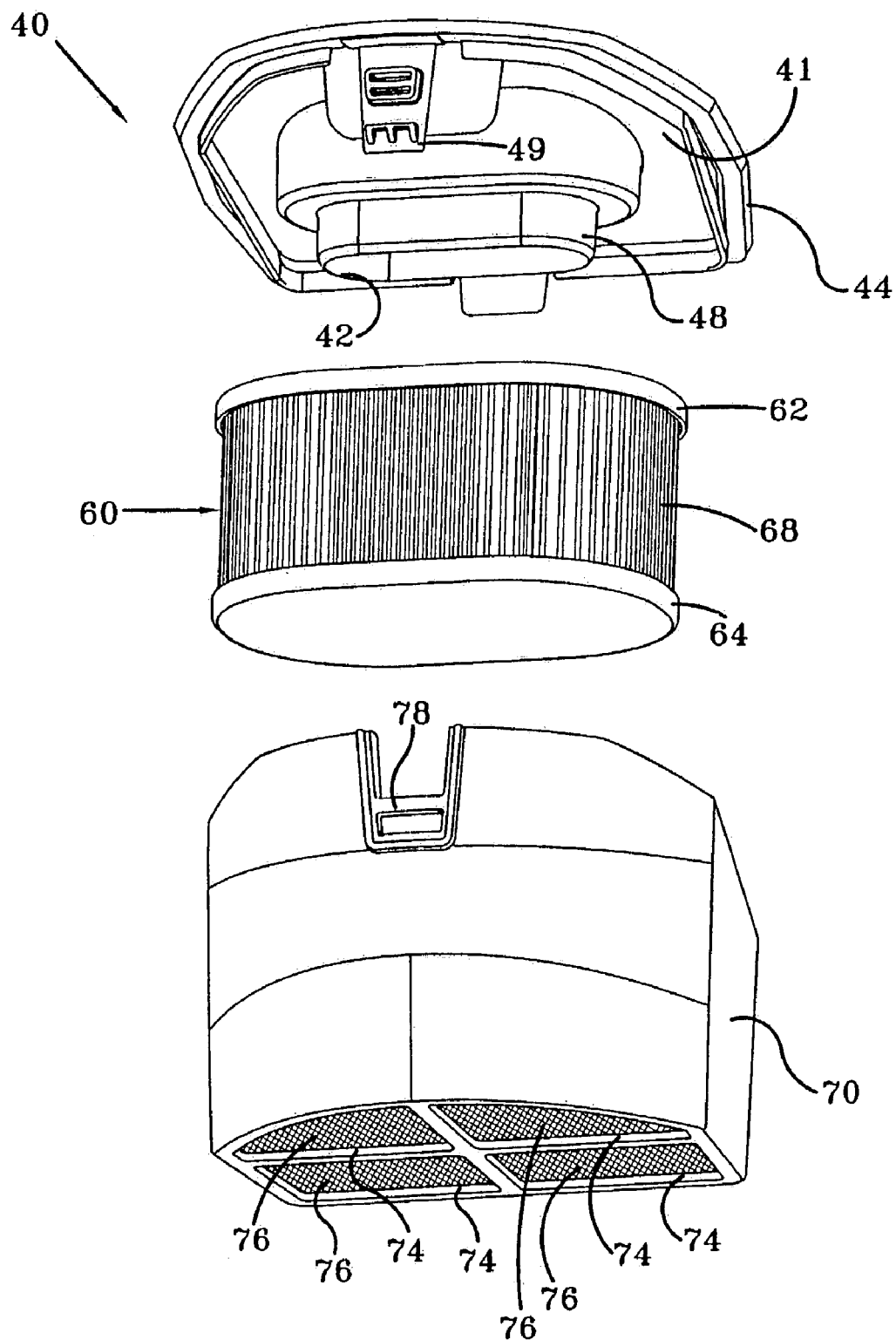
FIG. 4 is an exploded perspective view of the filter assembly of the dirt separation system of FIG. 3.

Referring now to FIG. 4, there is shown an exploded view of the filter assembly 40. The filter assembly 40 further includes a removable filter 60. The removable filter 60 includes a base plate 64, a sealing plate 62 with a filter exit 66 (See FIG. 5) defined therethrough, and a vertically extending filter element 68. The filter element 68 includes a first inner layer formed of a melt-blown polypropylene, a second middle layer formed of a spun-bond polyester and an outer third layer formed of an expanded polytetrafluoroethylene (ePTFE) membrane. The ePTFE outer layer provides non-stick properties to the filter element 68 and allows any dirt or dust accumulated on the filter element 68 to be easily displaced therefrom. Although the filter element 68 is shown and described as having three layers, it is understood that the filter material may include any number of layers or be formed of any number of materials such as a micro-glass or a melt-blown polyester without affecting the concept of the invention.

The filter exit 66 is adapted to seal to an extension 48 of the lid member 41 to place the exit opening 42 of the lid 41 in fluid communication with the filter exit 66. A upper edge of the filter element 68 is bonded to the sealing plate 62 and a lower edge of the filter element 68 is bonded to the base plate 64. The base plate 64 and sealing plate 62 form a generally oval shape around the exit opening 42 of the lid member 41. This oval shape provides a significant amount of filter material to be placed within small volume.

The filter member 68 is pleated around the oval track formed by the base plate 64 and sealing plate 62 to further increase the effective filter area of the filter member 68. It should be appreciated that once the removable filter 68 is assembled to the lid member 41 and the lid member 42 is placed in the dirt cup 50, the airflow from the dirt cup 50 may only exit through the exit opening 42 via the filter element 68, as the sealing arrangement 44 prevents air flow from by-passing the filter element 68.

The filter assembly 40 further includes a screen support 70 which surrounds the removable filter 60. The screen support 70 includes a number of horizontal openings 74 defined therethrough which place the interior of the screen support 70 in fluid communication with the exterior of the screen support 70. In addition, a screen element 76 covers each of the screen openings 74. The screen elements 76 may be formed of a number of different materials such as metal or synthetic mesh or screens, cloth, foam, a high-density polyethylene material, apertured molded plastic or metal, or any other woven, non-woven, natural or synthetic coarse filtration materials without affecting the scope of the invention. It should be appreciated that the screen element 76 separate dirt particles from an air stream prior to those particles reaching the filter element 68 of the filter 60.

The screen support 70 further includes a catch 78 defined thereon which is adapted to be engaged by a latch 49 of the lid member 41. The screen support 70 is attached to the lid member 41 when the latch 49 engages the catch 78. Alternatively, the screen support 70 may be removed from the lid member 41 when the latch 49 is disengaged from the catch 78.

Figure 5:
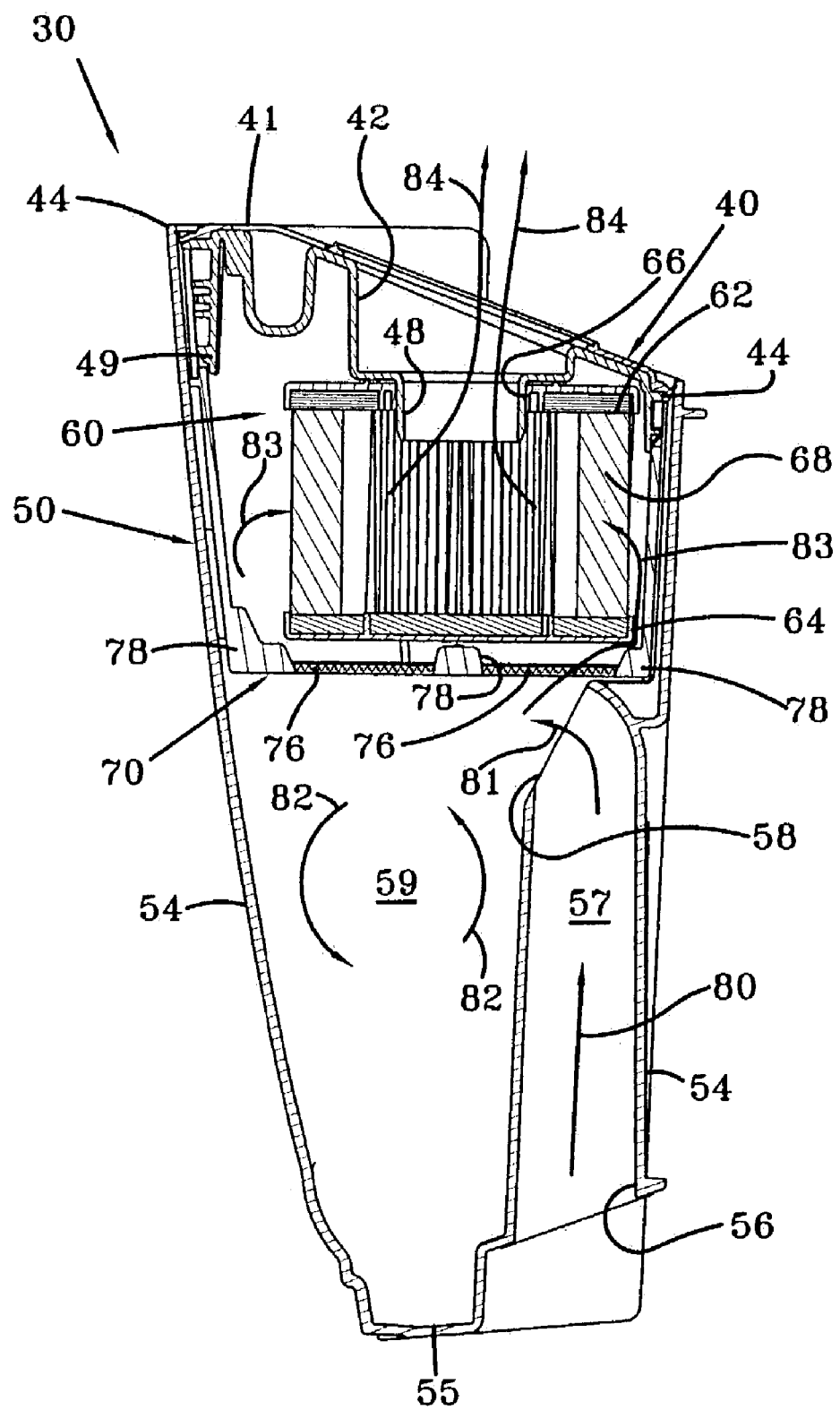
FIG. 5 is a cross-sectional view of the dirt separation system of FIG. 2, taken along the line 5—5.

Referring now to FIG. 5, there is shown a cross sectional view of the dirt separation system 30. When the dirt cup separation system 30 is secured to the upper housing 20, as shown in FIG. 1, the vacuum cleaner is placed in an operational mode. As shown, the dirt cup 50 further includes a bottom wall 55 having an inlet 56 defined therethrough. The inlet 56 seals against the inlet interface 22 of the upper housing 20 to place the dirt cup 50 in fluid communication with the agitator chamber 14. The dirt cup 50 further includes a conduit 57 which directs a dirt laden air stream from the inlet 56 to a flow directing nozzle 58, as indicated by arrow 80. The flow-directing nozzle 58 creates a sheet-like airflow, indicated by arrow 81, which is generally parallel to the screen elements 76 of the filter assembly 40. It should be appreciated that the air flow created by the flow directing nozzle 58 prevents dirt particles from accumulating on the screen elements 76 of the filter assembly 40. From the flow-directing nozzle 58, the air stream generally settles in an expansion chamber 59 wherein inertial and gravitational forces separate large particles from the air stream, as the air stream is generally directed as indicated by arrows 82.

The air stream exits the expansion chamber 59 via the screen elements 76. The screen elements 76 act as a primary separation means to separate coarse particles from the air stream which exits the expansion chamber 59. The air stream then generally passes (i) vertically through the screen elements 76, (ii) horizontally outwardly through a gap created between the screen elements 76 and the base plate 64 by tabs 78, vertically along an exterior of the filter 60, and horizontally toward the filter element 68, as generally indicated by the arrows 83. The filter element 68 act as a secondary separation means to separate fine particles from the air stream which exits the expansion chamber 59. The filter assembly 40 has the advantage of horizontal screen elements 76 which are cleaned by the nozzle 58 combined with the vertical filter element 68 which provides a relatively large filter area. The filtered air stream then exits the dirt separations system 30 via the exit opening 42 in the general direction of arrows 84. It should be appreciated that the exit opening 42 seals against the exit interface 24 (see. FIG. 2) of the housing when the dirt separation system 30 is secured to the upper housing (as shown in FIG. 1).

Figure 6A:
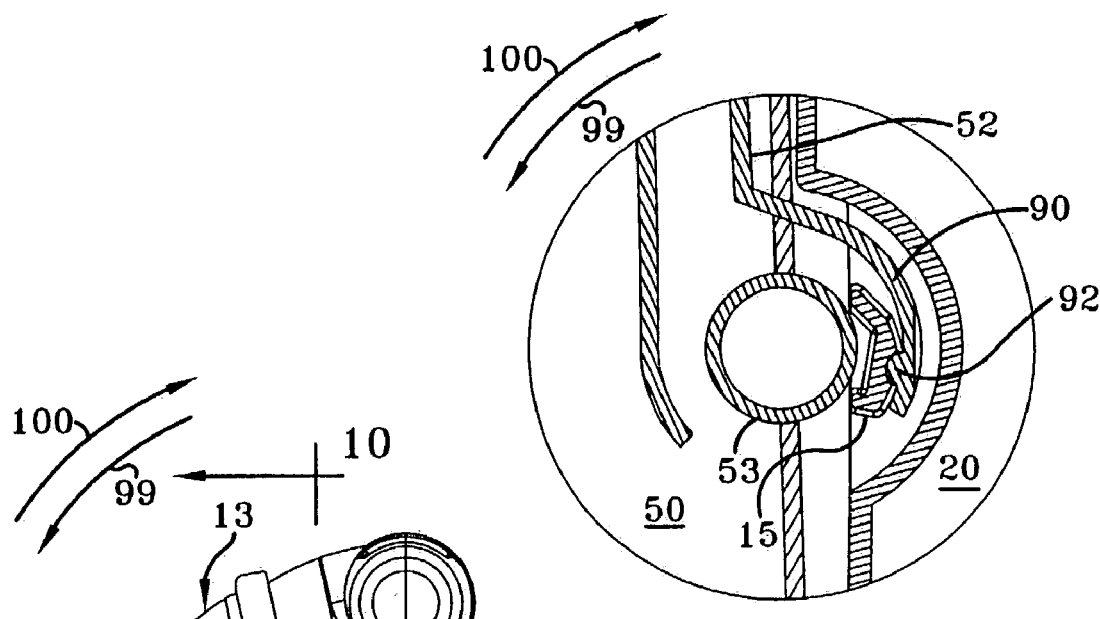
FIG. 6A is an enlarged cutaway view of a portion of the vacuum cleaner of FIG. 6.
Figure 6:
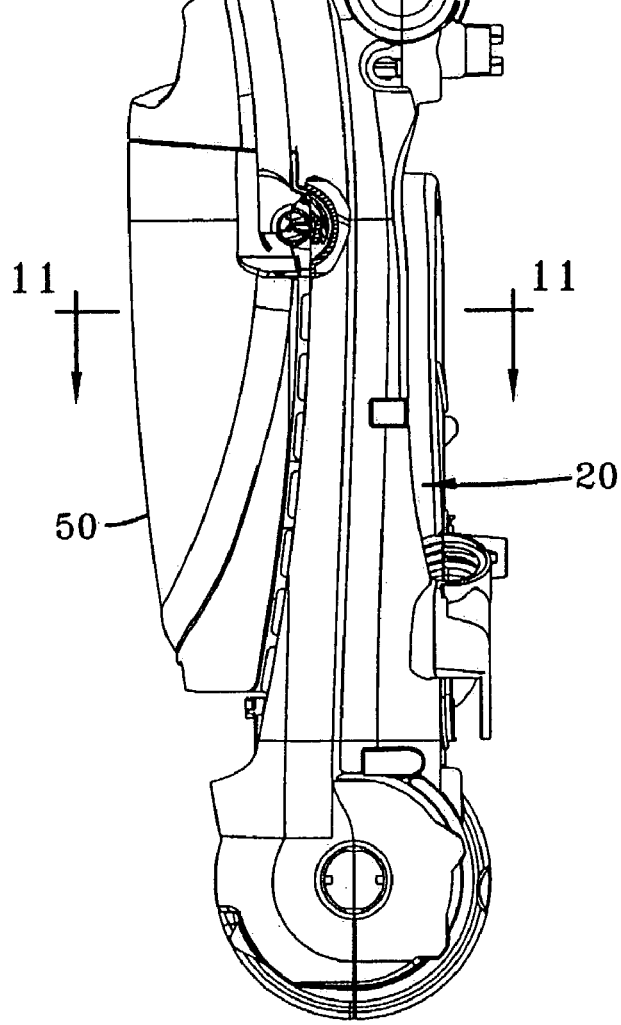
FIG. 6 is a side view of an upper portion of the vacuum cleaner shown in FIG. 1, showing a bucket handle in a first position.

Referring now to FIGS. 6 and 6A, there is shown a side view of the upper housing 20 showing the bucket handle 52 in the first position. In the first position, the handle 52 is substantially vertical. Furthermore, the bucket handle 52 is substantially flush with a surface 13 of the upper housing 20. The bucket handle 52 is rotatably mounted to the dirt cup or bucket 50 about a hub 53 such that the bucket handle 52 may rotate relative to the bucket 52 about the hub 53 in the general direction of arrows 99 and 100. FIG. 6A shows an enlarged portion of a latch portion 90 of the bucket handle 52. The latch portion 90 engages a catch 15 defined in the upper housing 20 as the bucket handle 52 is rotated in the general direction of arrow 100. In particular, an extension 92 of the latch portion 90 engages a detent defined in the catch 15. Thus, the latch portion 90 of the bucket handle 52 secures the bucket or dirt cup 50 to the upper housing 20 when the bucket handle 52 is positioned in the first position. When the bucket or dirt cup 52 is secured to the upper housing 20, the vacuum cleaner is placed in an operational mode whereby an air stream may be advanced from the nozzle 14 to the dirt separation system 30 where particles are separated from the air stream by the filter assembly 40.

Figure 7:
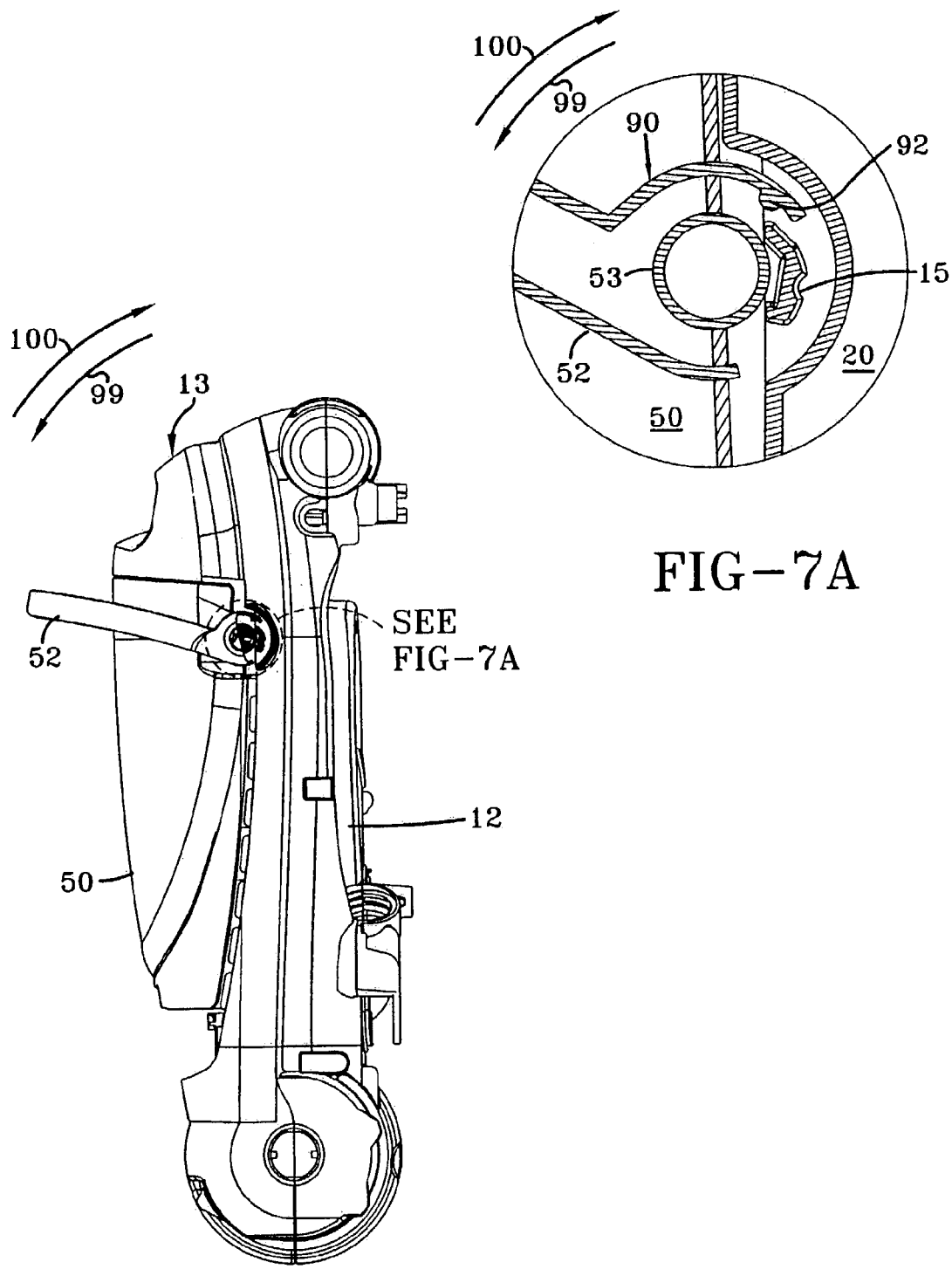
FIG. 7 is a view similar to FIG. 6, but showing the bucket handle in a second position.

Referring now to FIGS. 7 and 7A, there is shown the bucket handle 52 in second position. In the second position, the handle 52 is moved toward a horizontal plane from the first position shown in FIG. 6. FIG. 7A shows an enlarged partially cut-away of the latch portion 90 of the upper handle 52 in the second position. The latch portion 90 releases the catch 15 defined in the upper housing 20 as the bucket handle 52 is rotated in the general direction of arrow 99. In particular, an extension 92 of the latch portion 90 disengages the detent defined in the catch 15. Thus, the latch portion 90 of the bucket handle 52 releases the bucket or dirt cup 50 from the upper portion 20 when the handle 52 is positioned in the second position.

Figure 8:
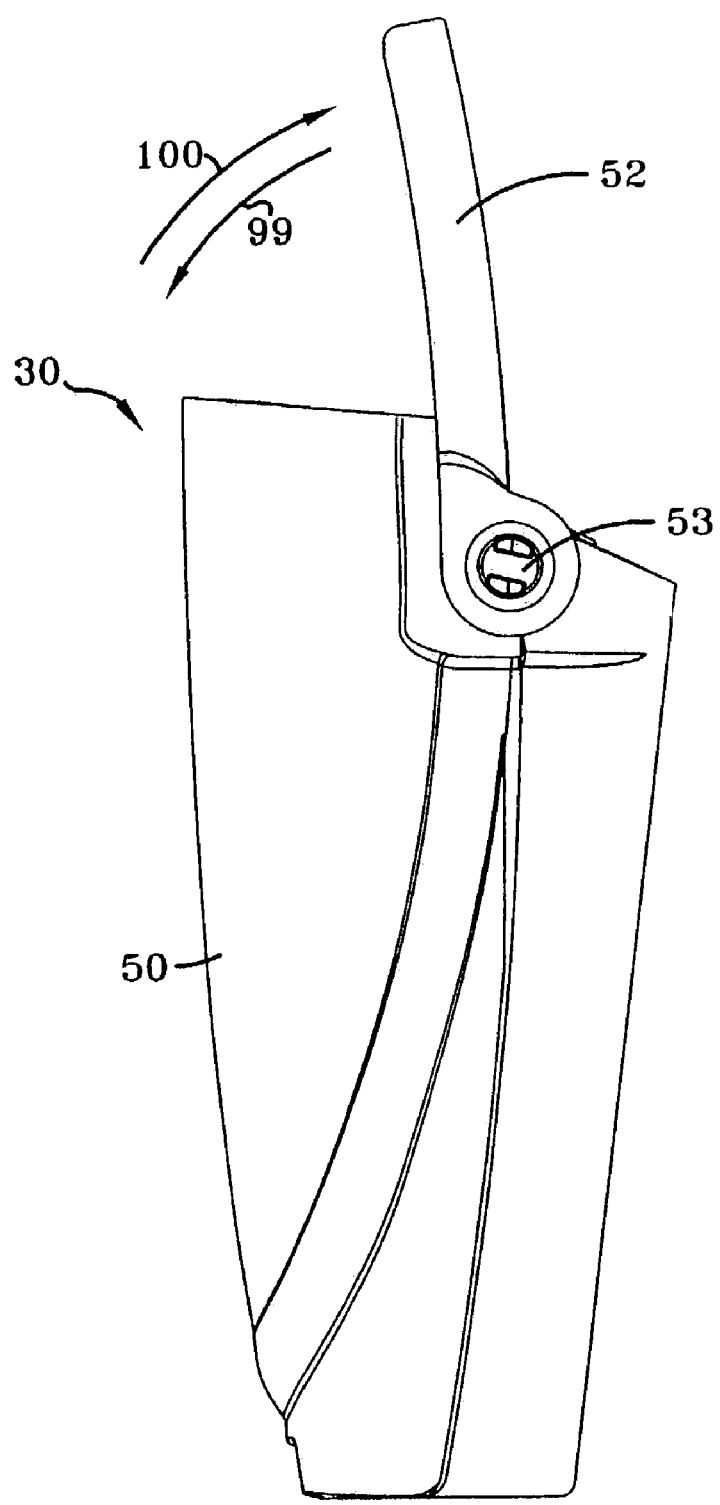
FIG. 8 is a side view of the removable dirt separation system of FIG. 2 in a carry position.

Referring now to FIG. 8, there is shown the dirt separation system 30 in a carry position. Once the dirt cup or bucket 52 is released from the upper housing 20, as described above, an operator may grasp the bucket handle 52 and carry the dirt separation system 30 to a dirt receptacle (not shown).

Figure 9:
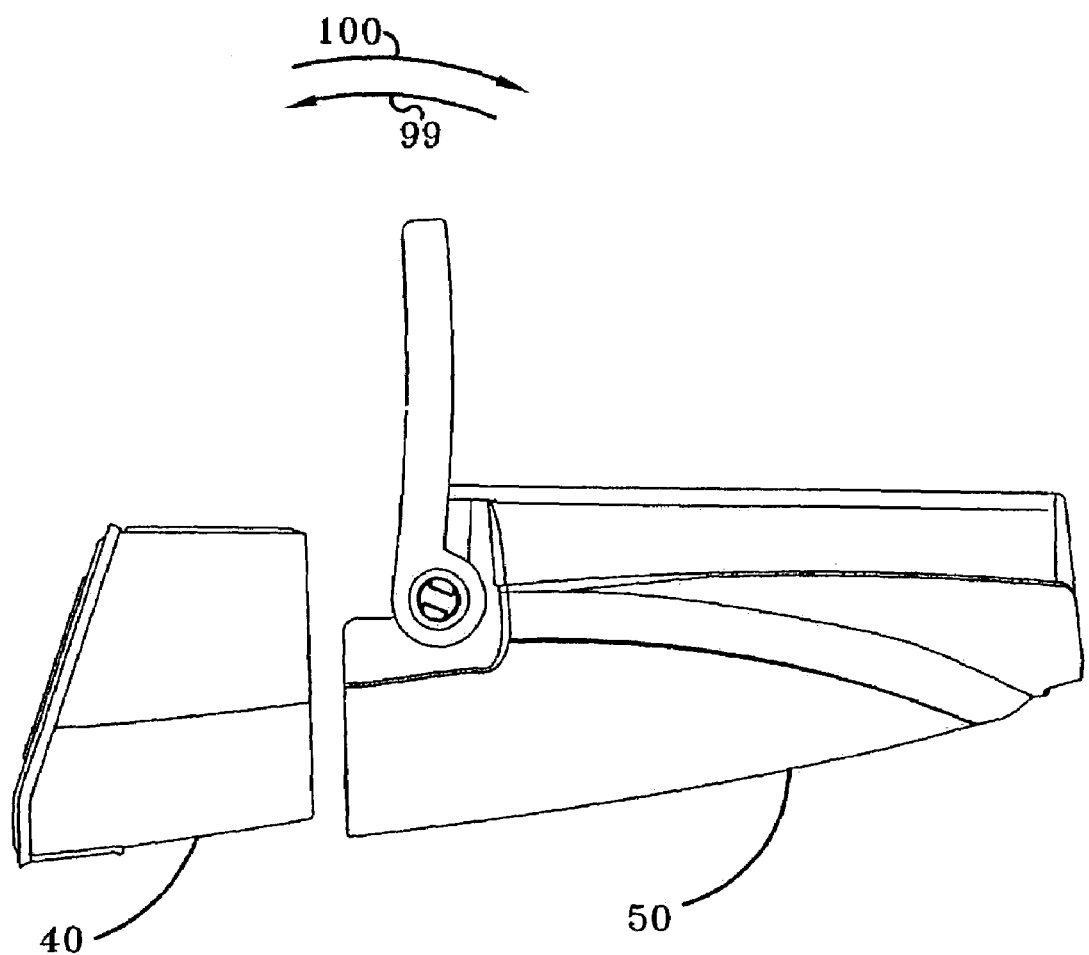
FIG. 9 is a view similar to FIG. 8, but showing the filter assembly removed and a dirt cup in an empty position.

Referring now to FIG. 9, there is shown the dirt separation system 30 in an emptying position. To move the dirt separation system 30 from the carry position to the emptying position, the filter assembly 40 is removed from the dirt cup 50, and the dirt cup 50 is rotated in the general direction of arrow 99 relative to the handle 52 to allow the contents of the dirt cup 50 to be emptied in the dirt receptacle. The filter assembly 40 may be further cleaned by detaching the screen support 70 and the filter 60 from the lid member 41, as shown in FIG. 4. Once detached, the screen elements 76 and filter element 68 may be cleaned by the operator. The filter assembly 40 may be reassembled and repositioned within the dirt cup or bucket 50 and the dirt separation system 30 returned to the carry position (shown in FIG. 8). Once in the carry position, the dirt cup 50 may be moved from the dirt receptacle to the vacuum cleaner 10. The dirt separation system 30 may then be repositioned in the upper housing 20 as shown in FIG. 7. The dirt cup or bucket 50 may then be secured to the upper housing 20 by moving the bucket handle 52 from the second position of FIG. 7 to the first position of FIG. 6, as described above. Securing the dirt cup to the upper housing places the vacuum cleaner in an operational mode.

Figure 10:
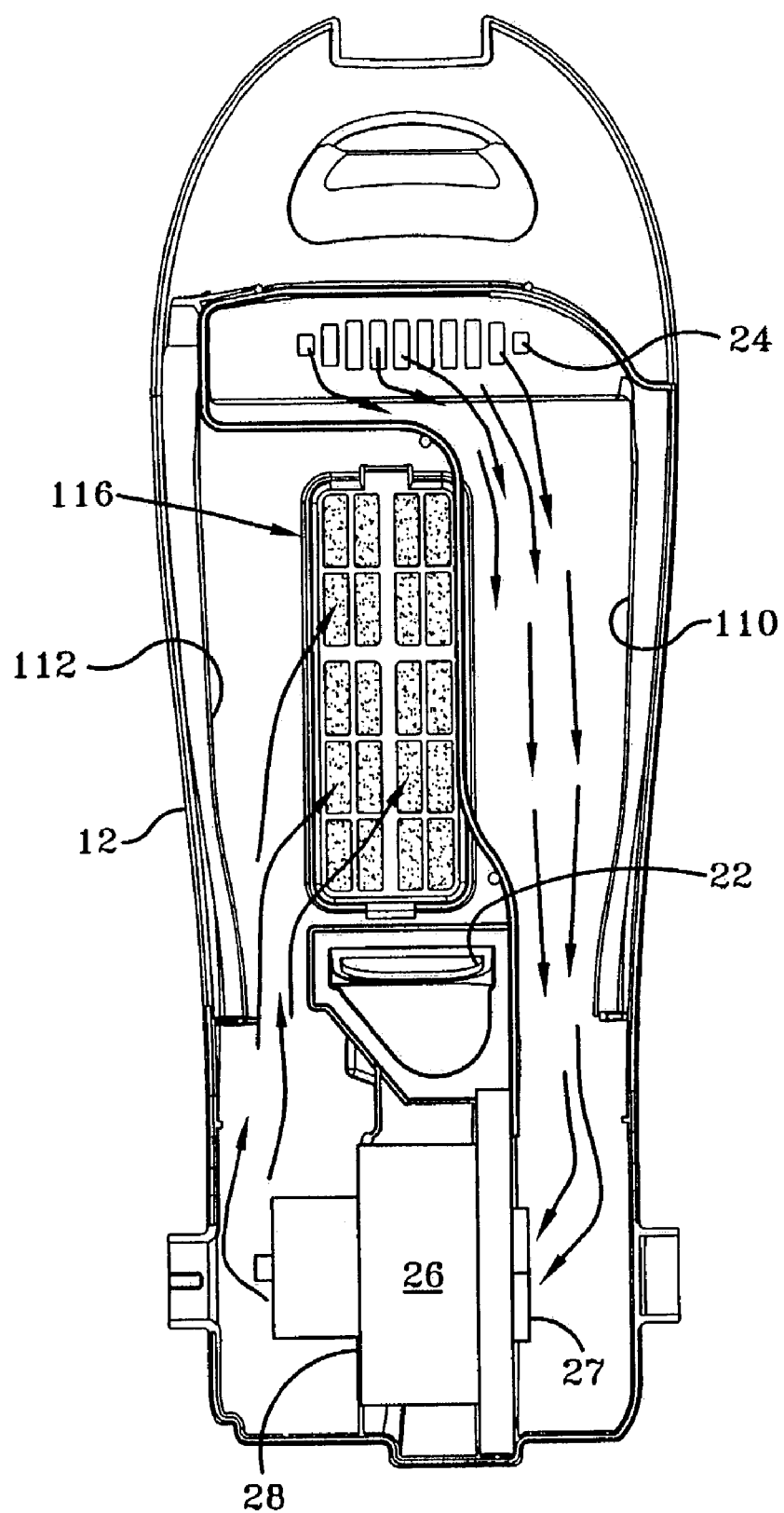
FIG. 10 is a cross-sectional view of the upper housing of the vacuum cleaner of FIG. 6, taken along the line 10—10 showing the air flow within the upper housing.

Referring now to FIG. 10, there is shown a cut-away view of the internal airflow path within the upper housing 20, as taken along the line 10—10 of FIG. 6. Airflow from the nozzle 14 is directed to the inlet interface 22 via a hose 170, shown in FIGS. 18 and 19. From the inlet interface 22, dirt enters the dirt separation system 30 via the inlet 56 and exits the dirt separation system 30 via the exit opening 42 as described above in connection with FIG. 5 above. The exit opening 42 is sealed against the exit interface 24. From the exit interface 24, filtered air is directed to an inlet 27 of the motor-fan unit 26 via a fan duct 110. The fan duct 110 within the housing 20 extends substantially the entire length of the dirt cup 50 as the exit interface 24 is positioned above of the dirt cup 50. It should be appreciated that the length of the fan duct 110 muffles noises created by the motor-fan unit 26. After exiting the motor fan unit 26 via the exit 28, the air flow is directed upwardly by a fan exhaust duct 112. The fan exhaust duct 112 directs the air flow to a final filter 116 comprising a filter element 117 and a filter retainer 118 (shown in FIG. 2). The fan exhaust duct 112 also extends substantially the entire length of the dirt cup 50. It should further be appreciated that the length of the fan exhaust duct 112 helps muffle noises created by the motor-fan unit 26.

Figure 11:
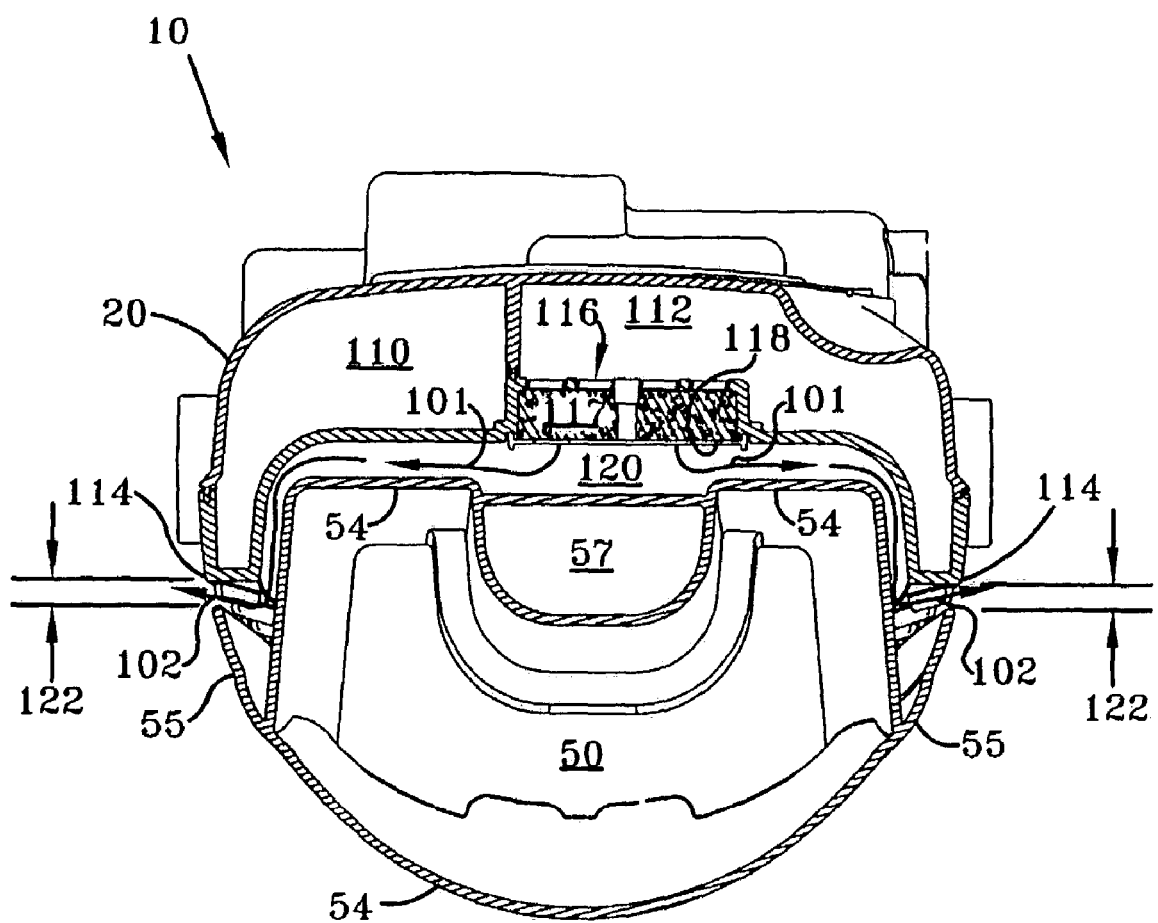
FIG. 11 is a cross sectional view of the upper housing and dirt cup of the vacuum cleaner of FIG. 6, taken along the line 11—11 showing the air flow around the dirt cup.

Referring now to FIG. 11, there is shown a cross sectional view of a portion of the upper housing 20 with the dirt cup 50 placed in the operational mode. The airflow which passes through the filter 116 exits the upper housing 20 into an expansion chamber 120 and travels generally laterally in the vacuum cleaner 10 in the general direction of arrows 101. The expansion chamber 120 is an expanding area defined between a portion of the upper housing 20 and a number of side walls 54 of the dirt cup 50 which allows the airflow to diffuse prior to exiting the vacuum cleaner 10. The expansion chamber 120 provides a significant reduction in the sound created by the motor/fan unit 26. The dirt cup 50 further includes a number of lateral extensions 55 which cooperate with surfaces 114 of the upper housing 20 to define an expansion chamber exit 122. After passing through the expansion chamber 120, the muffled air flow is allowed to exit the vacuum cleaner 10 along the length of the expansion chamber exit 122, in the general direction arrow 102, at a reduced velocity and sound level. The length of the expansion chamber exit 122 can best be seen in FIG. 1.

Figure 12:
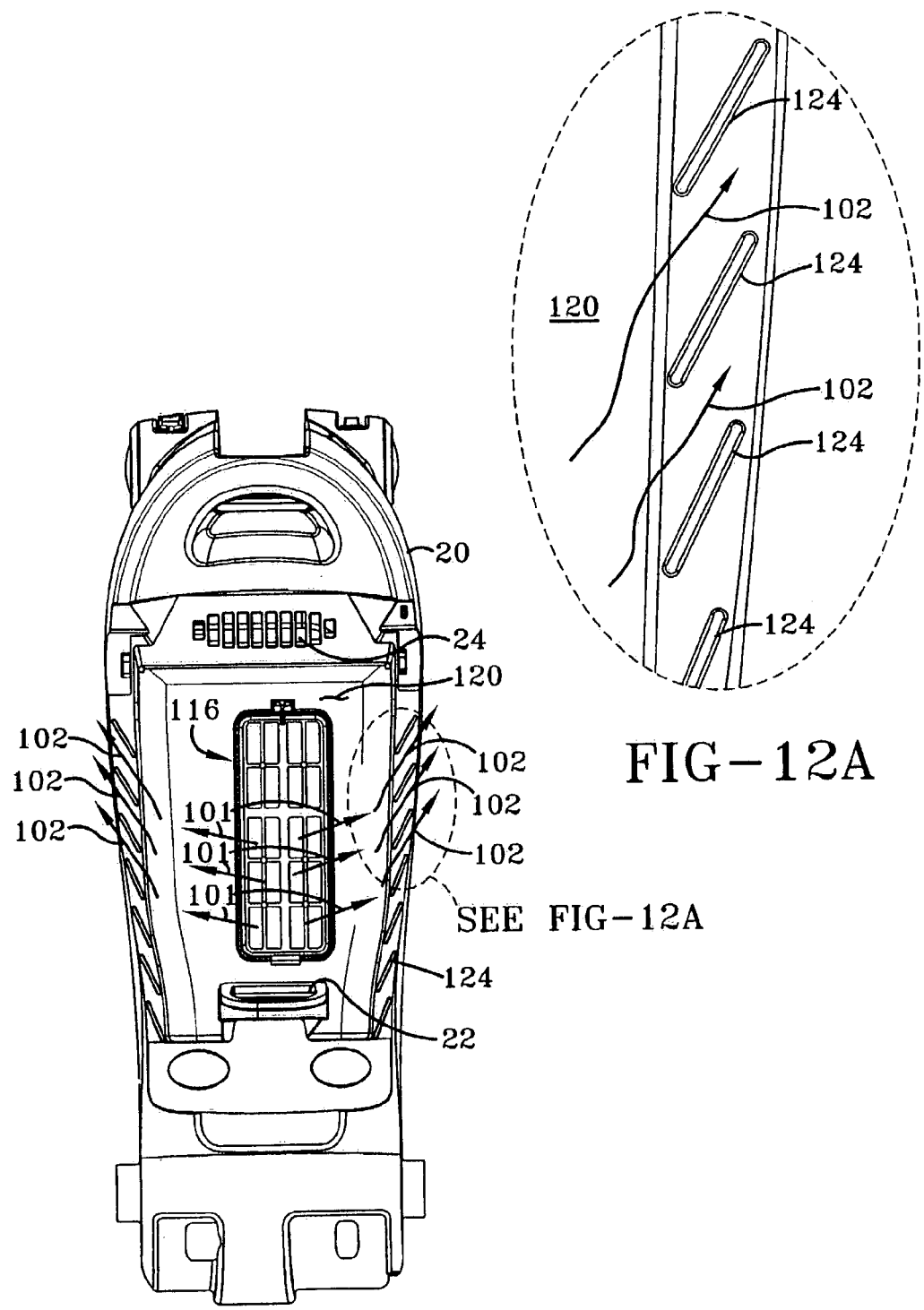
FIG. 12 is a front view of the upper housing of the vacuum cleaner of FIG. 2, as viewed along the line 12—12 showing the air flow around the exterior of the upper housing.

Referring now to FIGS. 12 and 12A, there is shown the air flow within the expansion chamber 120 having the dirt separation system 30 removed for clarity of description. In particular, it can be seen that the airflow indicated by the arrows 101 and 102 is vertically distributed along the height of the expansion chamber 120. In addition, it should be noted that a number of vanes 124 are attached to the upper housing 20. These vanes 124 direct the airflow away from the base 12. As the upwardly directed airflow passes through the expansion chamber exit 122, it does not disturb the surface being cleaned by the vacuum cleaner 10. In addition, it should be appreciated that the vanes 124 could alternately be placed on the lateral extensions 55 of the dirt cup 50 to direct the airflow away from the base 12.

Figure 13:
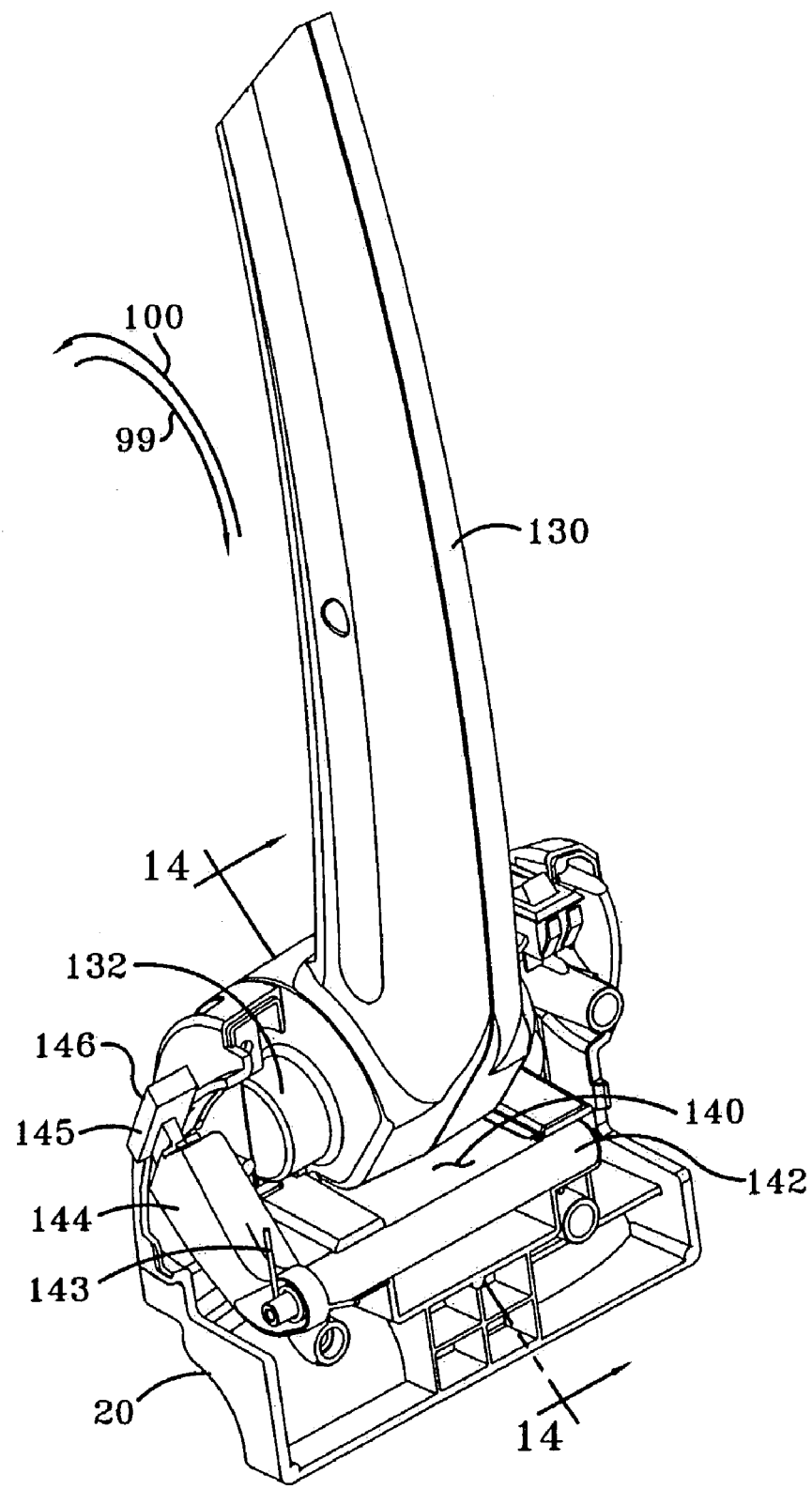
FIG. 13 is a partial cut away perspective view of an upper portion of the vacuum cleaner showing the handle locking mechanism.

Referring now to FIG. 13, there is shown a handle 130 positioned in an operational position. The handle 130 is rotatably mounted to the upper housing 20. The handle 130 rotates about a round axle extension 132 attached to a lower portion of the handle 130. This arrangement allows the handle 130 to rotate about the axel extension 132 in the direction of arrows 99 and 100. A latch 140 is provided to secure the handle 130 in the operational position. The latch 140 rotates about an axel 142 in the general direction of arrows 99 and 100. The axis of rotation of the latch 140 about the axel 142 is offset from the axis of rotation of the handle 130 about the axle extension 132 such that the latch 140 may engage exterior portions of the handle 130. A spring 143 interposed between the housing 20 and the latch 140 biases the latch 140 in the general direction of arrow 99. A lever 144 is secured to the axel 142. An extension of the lever 144 is the actuator 145 which extends through the housing 20 and allows and operator to rotate the latch 140 in the general direction of arrow 100 by depressing the actuator 145. The textured surface 146 of the actuator assists the operator in moving the actuator 145.

Figure 14:
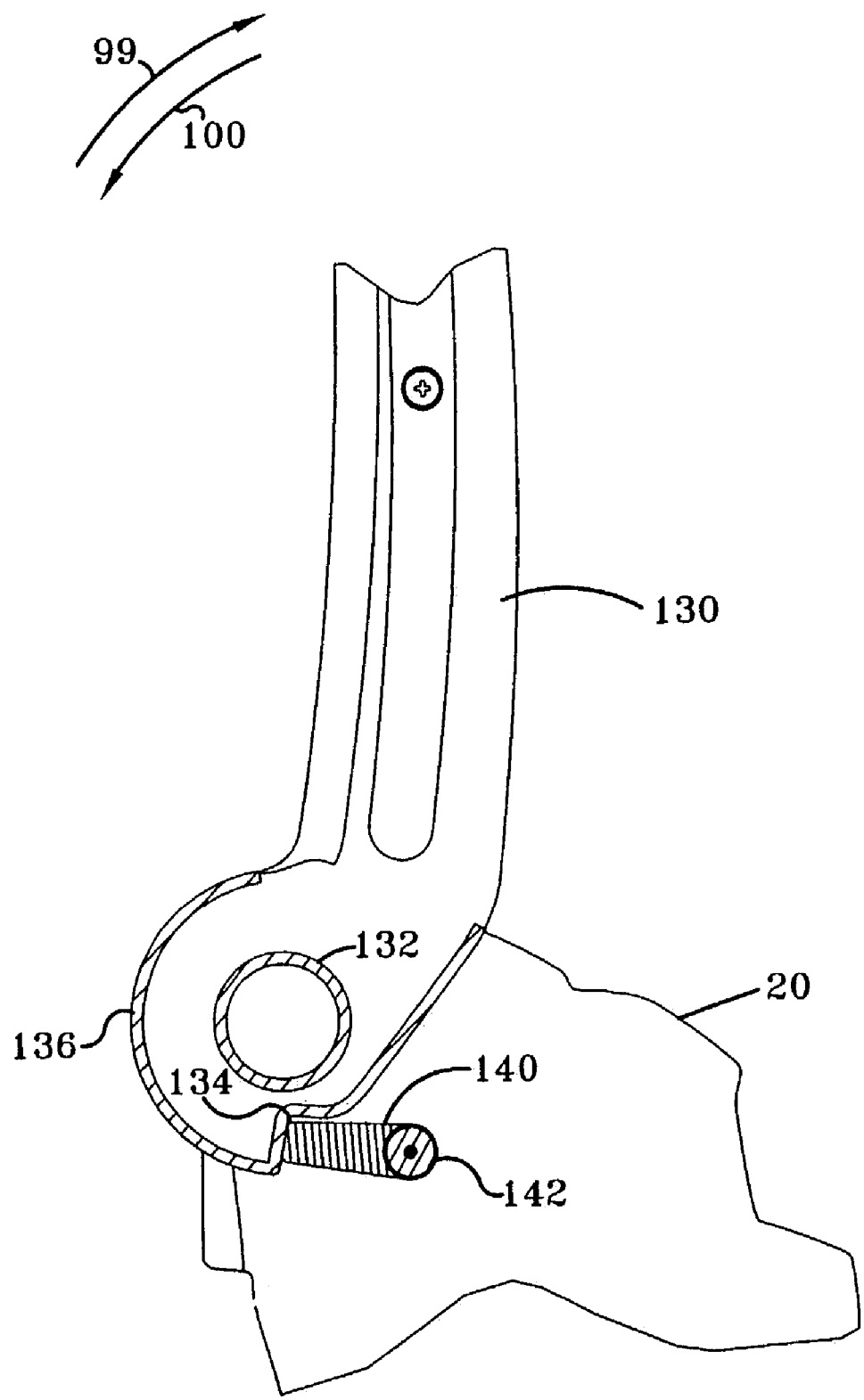
FIG. 14 is a partial cross sectional view of the upper housing of FIG. 13, taken along the line 14—14 and showing the latch in a latched position.

Referring now to FIG. 14, there is shown a partial schematic view of the engagement of the latch 140 with the handle 130. In particular, as the spring 143 biases the latch 140 in the general direction of arrow 99, the latch 140 engages a notched engagement surface 134 of the handle 130. Biasing the latch 140 against the engagement surface 134 places the latch 140 in the locked position which holds the handle 130 in an operational position. It should be appreciated that the latch 140 engages the handle 130 over substantially the entire width of the handle 130 to provide a substantial latching force between the handle 130 and the latch 140.

Figure 15:
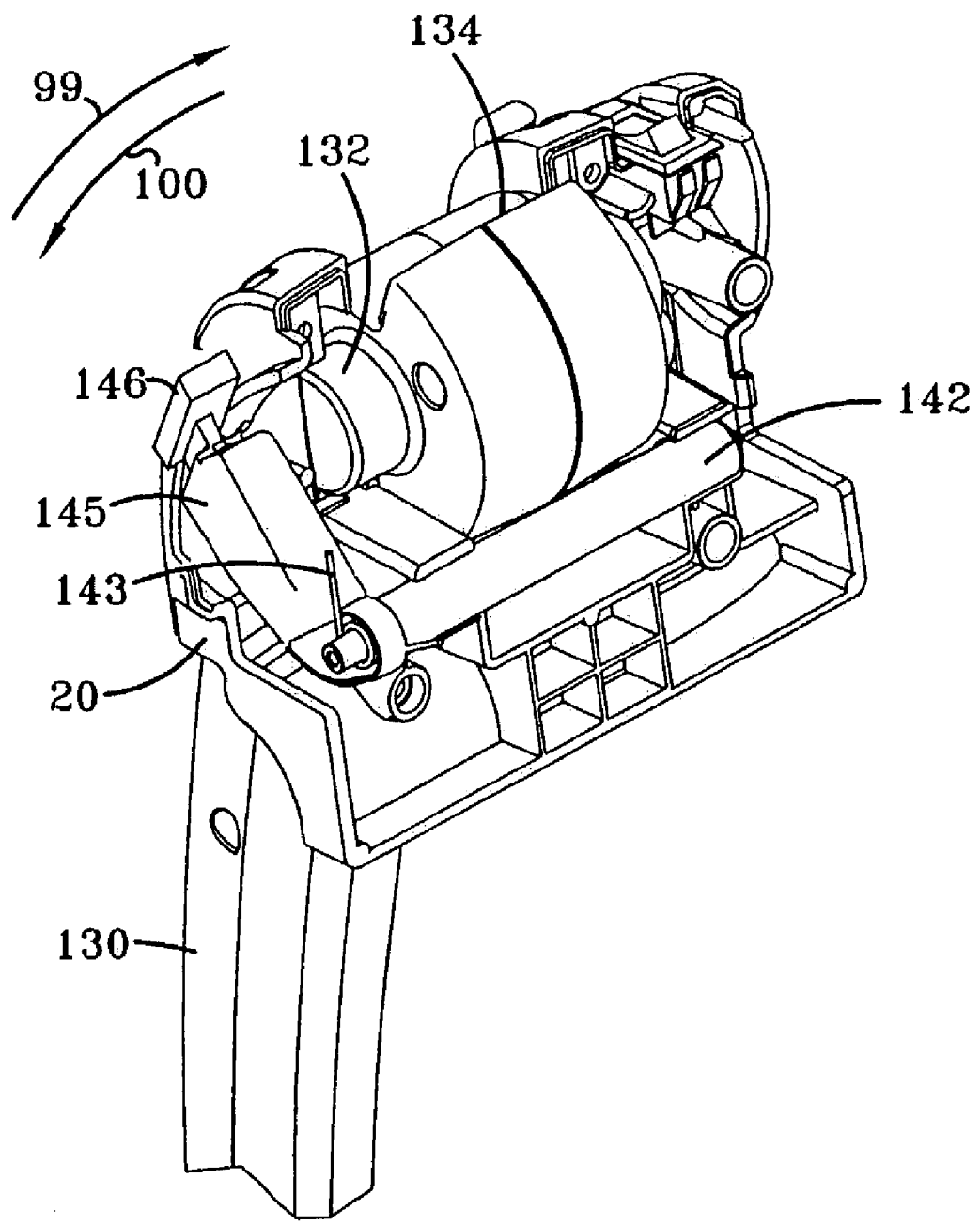
FIG. 15 is a view similar to FIG. 13, but showing the latch in a release position.
Figure 16A:
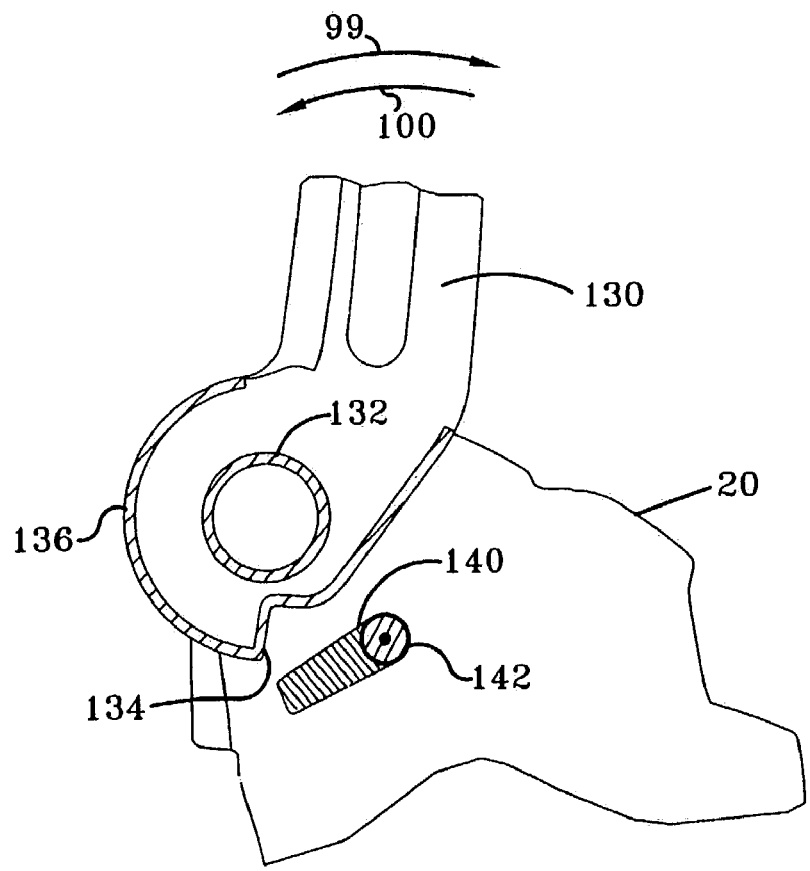
FIG. 16A is a view similar to FIG. 14, but showing the latch in a release position and the handle in an operational position.
Figure 16B:
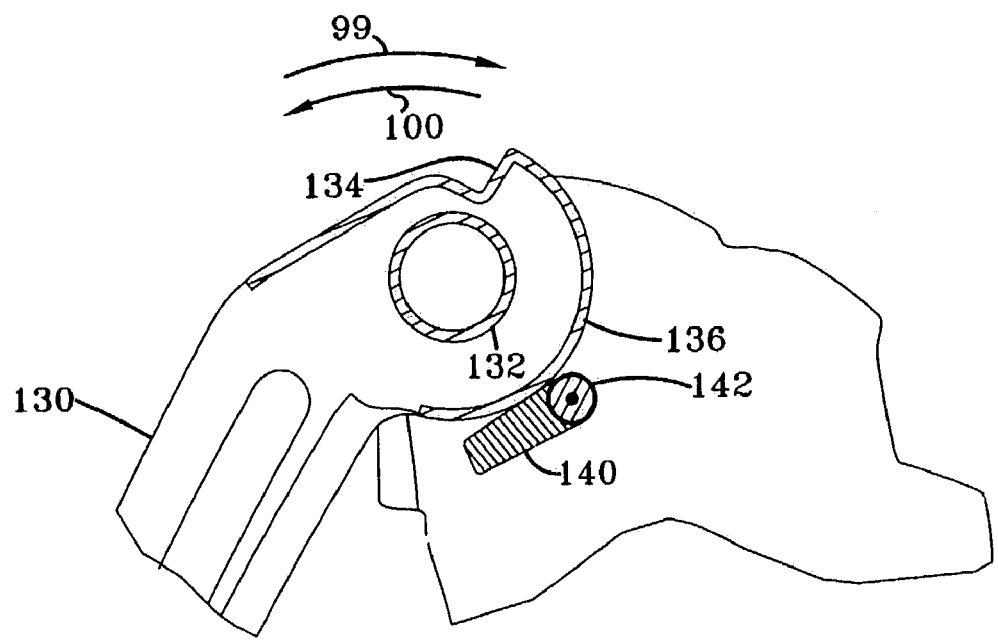
FIG. 16B is a view similar to FIG. 16A, but showing the handle in a storage position.

Referring now to FIG. 15, there is shown the latch 140 in the release position, which allows the handle 130 to be placed in a storage position. To place the latch in the release position, the operator moves the actuator 145 in the general direction of arrow 100 by overcoming the biasing force of the spring 143 and rotating the latch 140 in the general direction of arrow 100. Placing the latch 140 in the release position, moves the latch 140 out of contact with the notched engagement surface 134 of the handle 130 thereby allowing the handle 130 to be rotated in the general direction of arrow 100 (see. FIG. 16A). The handle 130 may then be freely rotated in the general direction of arrow 100 as the latch 140 slides along an arcuate surface 136 of the handle 130 when the latch is in the release position (see FIG. 16B). Thus, the handle 130 may be placed in the storage position shown in FIGS. 15 and 16B. To move the handle to the operational position from the storage position, the operator rotates the handle 130 in the general direction of arrow 99 until the biasing force of the spring 143 causes the latch 140 to engage the notched engagement surface 134 of the handle 130, as shown in FIG. 14.

Figure 17:
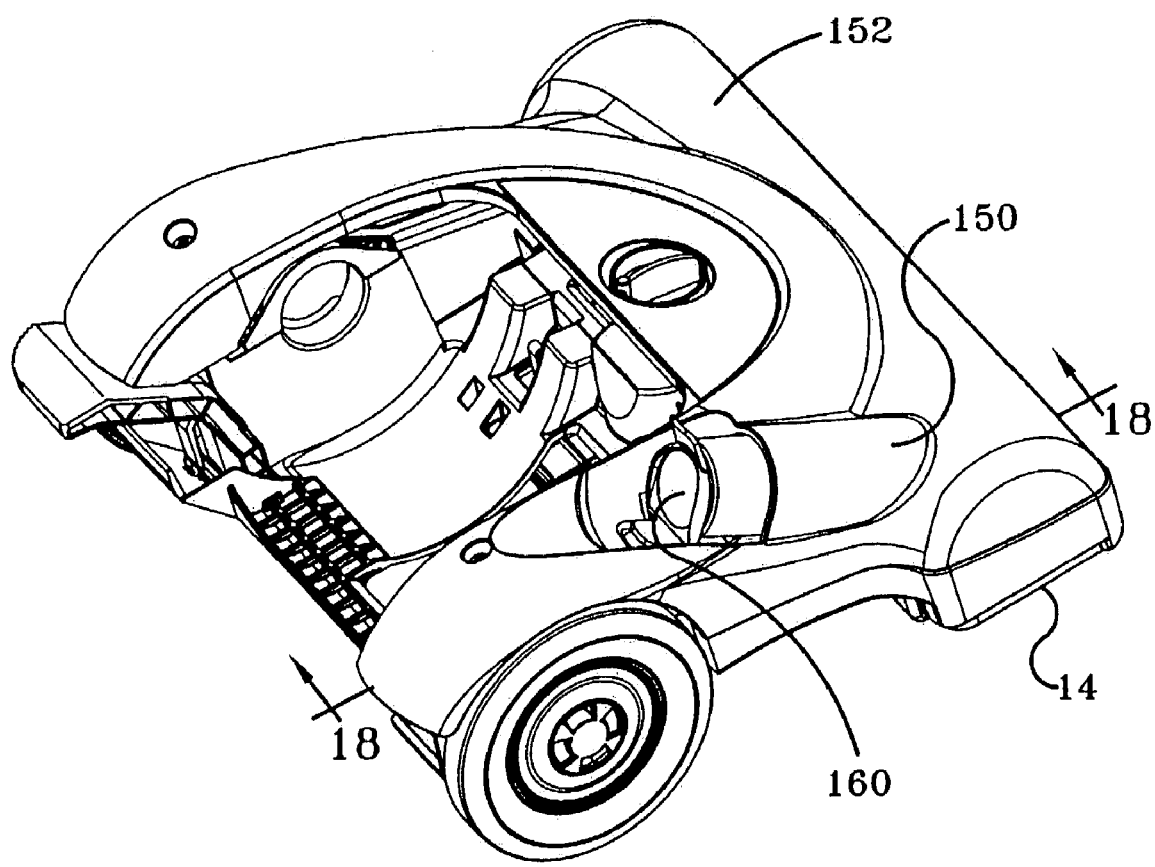
FIG. 17 is a perspective view of the base of the vacuum cleaner shown in FIG. 1.
Figure 18:
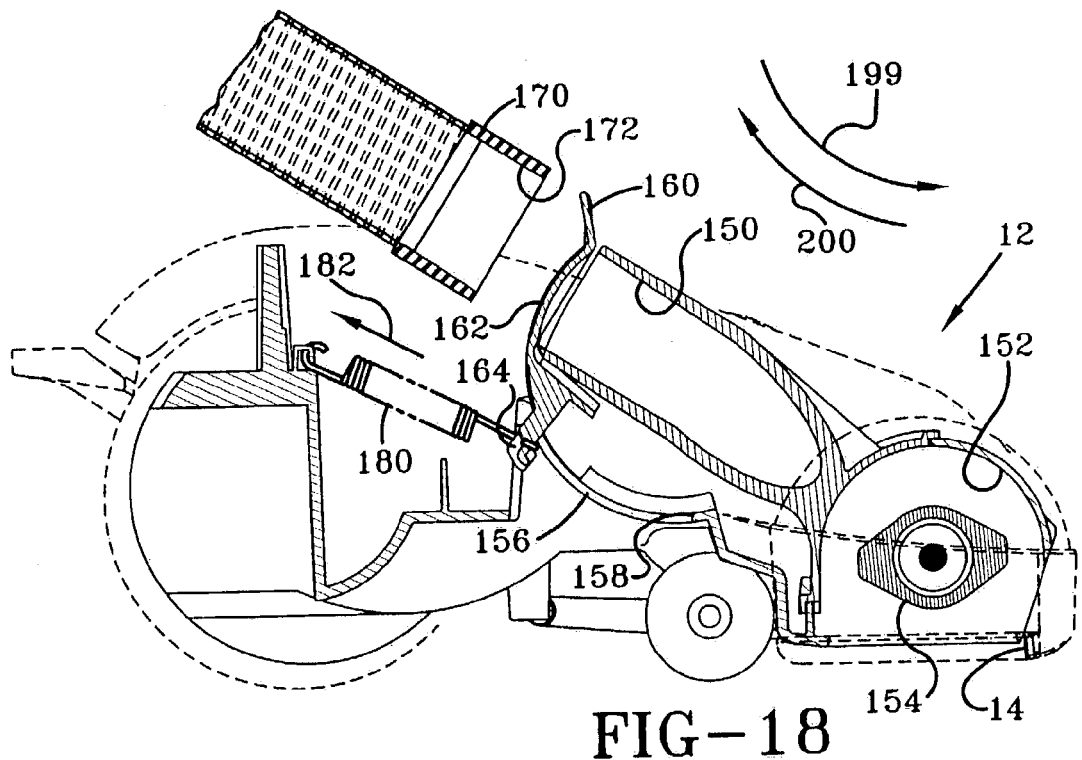
FIG. 18 is a cross sectional view of the base of the vacuum cleaner of FIG. 17, taken along the line 18—18 showing the blocker door in a closed position.
Figure 19:
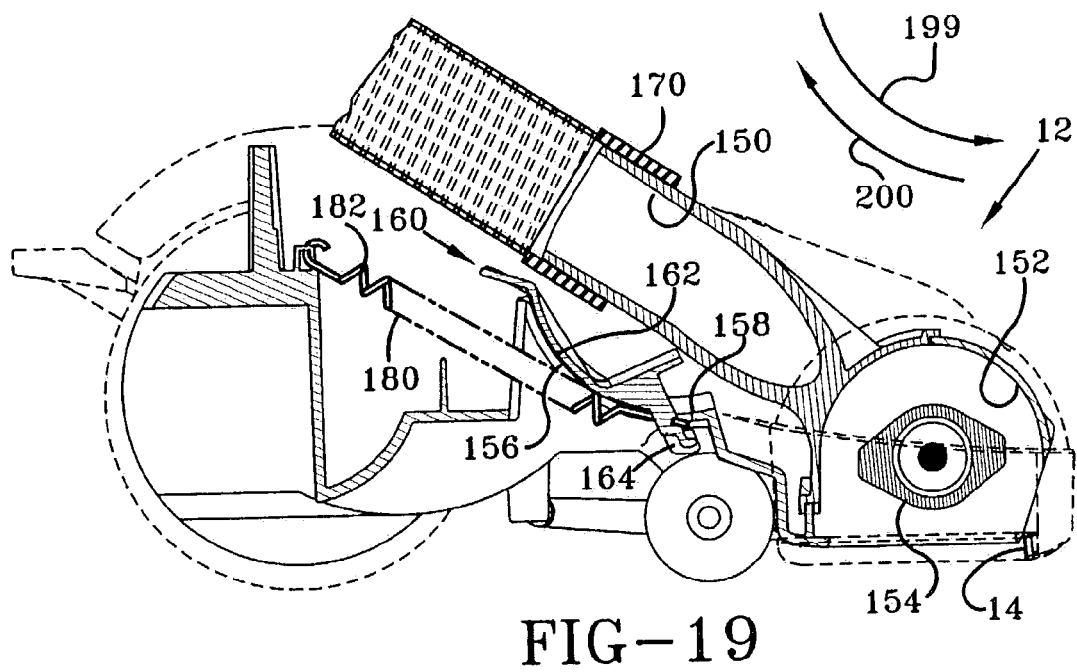
FIG. 19 is a cross sectional view similar to FIG. 18 but showing the blocker door in an open position.

Referring to FIGS. 17–19, there is show the base 12 of the vacuum cleaner 10. The base 12 further includes a duct 150 placed in fluid communication with an agitator chamber 152 having a rotating agitator 154 positioned within. The base 12 further includes a blocker door 160 movable between a closed position (shown in FIGS. 17 and 18) and an open position (shown in FIG. 19). When the blocker door 160 is placed in the open position, a flexible hose 170 may be placed on the outer surface of the duct 150. The flexible hose 170 is in fluid communication with the inlet interface 22 (shown in FIG. 2). The flexible hose 170 is in further fluid communication with the dirt separation system 30 and motor/fan unit 26 when the vacuum cleaner 10 is in the operational position. Thus, when the motor/fan unit 26 is operating, suction from the motor fan unit 26, is transmitted to an end 172 of the hose 170. For carpet cleaning, the hose 170 is attached to the duct 160 to further place the hose 170 in fluid communication with the nozzle opening 14. For above the floor cleaning, which typically involves placing tools (not shown) on the end 172 of the hose 170, the hose 170 is disconnected from the duct 160. When the hose 170 is disconnected from the duct 160, it is desirable to prevent access to the agitator chamber 152 via the duct 150. Thus, it is desirable for the blocker door 160 to move into the closed position shown in FIGS. 17 and 18 when the hose 170 is disconnected from the duct 160.

Referring now to FIGS. 18 and 19, the base 12 further includes an arcuate track 156 defined therein. The arcuate track 156 is adapted to engage an arcuate surface 162 of the blocker door 160 such that the blocker door 160 may slide and rotate relative to the base 12 in the general direction of arrows 199 and 200. The blocker door 160 further includes a tab 164 which passes through a slot 158 defined in the track 156. A spring 180 is interposed between the tab 164 and the base 12 to bias the tab 164 in the general direction of arrow 182. It should be appreciated that biasing the tab 164 in the general direction of arrow 182 also biases the blocker door 160 in the general direction of arrow 200 to place the blocker door in the closed position shown in FIGS. 17 and 18.

In operation, when the flexible hose 170 is disconnected from the duct 160, the biasing force of the spring 180 causes the blocker door 160 to slide in the general direction of arrow 200 and place the blocker door 160 in a closed position. Placing the blocker door 160 in the closed position blocks access to the agitator chamber 152 via the duct 160 (see FIGS. 17 and 18). To return the vacuum cleaner 10 to a floor cleaning mode, the flexible hose 170 is connected to the duct 150. To accomplish this, an operator may press on an upper surface of the blocker door 160 to cause the blocker door to slide along the track 156 and rotate in the general direction of arrow 199. As the biasing force of the spring 180 is overcome, the blocker door 160 is placed in the open position shown in FIG. 19 and the flexible hose 170 may be connected to the duct 160. It should be appreciated, that the end 172 of the flexible hose 170 may also be used to slide the blocker door 160 along the track 156 the closed position to the open position, thus allowing an operator of the vacuum cleaner 10 to connect the flexible hose 170 to the duct 150 using a single hand.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

The invention claimed is:

1. A dirt filtering apparatus, comprising:
   a lid member having an exit opening defined therethrough;
   a sealing arrangement around the periphery of the lid member and adapted to engage a sidewall of a removable dirt cup;
   a removable filter attached to the lid member in a covering relationship to the exit opening;
   a removable screen support attached to the lid member and surrounding the filter member;
   a horizontal opening defined through the screen support; and
   a rigid screen element covering the horizontal opening and spaced apart from the filter element.

2. The dirt filtering apparatus of claim 1, the filter further comprising:
   a base plate;
   sealing plate having a filter exit defined therethrough; and
   vertically extending filter element having an upper edge bonded to the sealing plate and a lower edge bonded to the base plate.

3. The dirt filtering apparatus of claim 2, wherein:
   the base plate has a generally oval shape,
   the sealing plate has a generally oval shape, and
   the filter element follows an oval path.

4. The dirt filtering apparatus of claim 3, wherein the filter element is pleated along the oval path.

5. The dirt filtering apparatus of claim 1, further comprising:
   a latching member secured to the lid member; and
   a catch defined in the screen support, wherein:
   the screen support is attached to the lid member when the latching member engages the catch, and
   the screen support may be removed from the lid member when the latching member is disengaged from the catch.

6. The apparatus of claim 5 wherein the filter may be removed from the lid when the screen support is removed from the lid.

7. The apparatus of claim 2, further comprising:
   a number of support tabs positioned on the screen support proximate to the horizontal openings, wherein:
   a gap is formed between the base plate of the filter and the screen support by the support tabs.

8. The apparatus of claim 7, wherein:
   an airflow enters the apparatus via the horizontal opening,
   the airflow travels radial outwardly through the gap,
   the airflow enters the filter via the filter element, and
   the airflow exits the filter exit and exit opening.

9. An upright vacuum cleaner, comprising:
   carpet engaging nozzle base;
   an upper housing pivotally connected to the nozzle base;
   a dirt cup removably secured to the upper housing;
   a lid member having an exit opening defined therethrough;
   a sealing arrangement around the periphery of the lid member and adapted to engage a sidewall of the removable dirt cup;
   a removable filter attached to the lid member in a covering relationship to the exit opening;
   a removable screen support attached to the lid member and surrounding the filter member;
   a horizontal opening defined through the screen support; and
   a rigid screen element covering the horizontal opening and spaced apart from the filter element.

10. The apparatus of claim 9, the filter further comprising:
    a base plate;
    a sealing plate having a filter exit defined therethrough; and
    a vertically extending filter element having an upper edge bonded to the sealing plate and a lower edge bonded to the base plate.

11. The dirt filtering apparatus of claim 10, wherein:
    the base plate has a generally oval shape,
    the sealing plate has a generally oval shape, and
    the filter element follows an oval path.

12. The apparatus of claim 11, wherein the filter element is pleated along the oval path.

13. The dirt filtering apparatus of claim 9, further comprising:
    a latching member secured to the lid member; and
    a catch defined in the screen support, wherein:
    the screen support is attached to the lid member when the latching member engages the catch, and
    the screen support may be removed from the lid member when the latching member is disengaged from the catch.

14. The apparatus of claim 13 wherein:
    the screen support may be removed from the lid when the lid is removed from the dirt cup, and
    the filter may be removed from the lid when the screen support is removed from the lid.

15. The apparatus of claim 10, further comprising:
    a number of support tabs positioned on the screen support proximate to the horizontal openings, wherein:
    a gap is formed between the base plate of the filter and the screen support by the support tabs.

16. The apparatus of claim 15, wherein:
    an airflow enters the apparatus via the horizontal openings,
    the airflow travels radial outwardly through the gap,
    the airflow enters the filter via the filter element, and the airflow exits the filter and dirt cup through the exit opening of the lid.

17. A method of operating a filter assembly, comprising the steps of:
attaching a filter member to a lid member having an exit opening defined therethrough;
positioning a screen support about the filter member;
securing the screen support to the lid member;
positioning a horizontal rigid screen panel across an opening defined in the screen support: and
sealing the lid member to a side wall of a dirt cup.

18. The method of claim 17, further including the step of latching the screen support the lid member.

19. The method of claim 17, further including the step of unlatching the screen support from the lid.

20. The method of claim 18, further including the step of detaching the filter from the lid.

21. The method of claim 17, further including the step of spacing the screen support from the filter.

* * * * *